Patented June 4, 1946

2,401,369

UNITED STATES PATENT OFFICE 2,401,369

TREATMENT OF CASTOR OIL, AND IN CASTOR OIL CONTAINING PRODUCTS

Adam J. Paluszek, Port Chester, N. Y., assignor of fifteen per cent to James H. Hayes, Green Farms, Conn.

No Drawing. Application April 13, 1945, Serial No. 588,263

18 Claims. (Cl. 252—56)

My invention relates to the complete distillation of castor oil and its use for improving lubricating oils. The present application is a continuation-in-part of my application, Serial No. 467,648, filed December 2, 1942.

The use of castor oil as an additive agent to mineral oil, in order to improve the latter's lubricating efficiency has long been recognized because of the active-principle and "oiliness" which castor oil possesses and which is lacking in the mineral oil.

Raw or untreated castor oil, unlike any other vegetable or fixed oil, is immiscible with mineral oil; hence, processes for rendering the castor miscible with mineral oil have been invented and recorded in the U. S. Patent Office. My exhaustive experimentation with castor oil has proven that the miscible or modified castor oil, by whatever process it is manufactured, is not satisfactory as a lubricant, whether used as a composite part with mineral or by itself, and does not promote or improve lubricity of mineral oils because of its presence. On the contrary, it may promote and accelerate the formation of tacky-gummy deposits on the moving parts of the machinery because of the gum forming elements inherent in castor oil, which are not eliminated or reformed by a process of heating to elevated temperatures and blowing air through it. As a matter of fact, the gum in the castor oil is thus formed.

The uncommon lubricating properties as well as the remedial value possessed by castor oil, has been recognized from time immemorial. Its complex composition, however, has produced a formidable barrier to investigation and evaluation of its great potentialities for industrial and medicinal applications. This barrier is apparently the reason which made it impossible to completely distill off castor oil in a pure state. For example: Using the conventional methods of distillation, only about 18% can be distilled off, and the rest of the mass will become a solid product resembling a tacky sponge, and is of no further value.

The important factor of my invention, therefore, lies in the discovery of a method of distilling castor oil completely without causing solidification of the distilland by this distillation. My invention also relates to further purification processes described herein, and through which processes the deleterious and gum forming properties inherent in the original castor oil are eliminated or reformed. The resulting castor distillate then possesses all the valuable properties of the polar hydrocarbon group with surface activity and wetting ability. It can be employed as a penetrant-solvent agent. It becomes miscible in mineral oil and fixed oils in any proportion but insoluble in water.

Once the castor oil is completely distilled, it offers no further obstacles and can be redistilled over and over again without decomposition, thus, I believe, opening unpredictable possibilities of its remedial values.

The process for the complete distillation of castor oil, according to my invention, is carried out by heating the castor oil in the presence of a small amount of substance of different chemical nature than the castor oil itself.

The substances used by me as distillation agents for the complete distillation of castor oil are: sodium chloride, diatomaceous earth, clay such as fuller's earth or bentonite, aluminum hydrate, anhydrous silica, or silica gel.

For complete distillation, the distilling apparatus should be constructed from stainless steel, aluminum, or high carbon steel polished on the inside, since otherwise the distillate may become dark. No brass or copper should come in contact with the castor oil during the distillation process. The distillation should preferably be conducted in a unit batch. Not more than 65% of castor oil, which should be equivalent to 65% of the capacity of the distilling kettle, should be mixed intimately with 10% of its weight with sodium chloride, or any of the substances mentioned above. These ingredients are charged into the distilling apparatus and heated.

The process of distillation of the castor oil according to my invention, may be carried out by different modifications of working.

The castor oil with the described distillation substance chosen, may be distilled off while applying a vacuum, stirring or both, so as to provide a quick removal of vapors formed.

Following are some examples how the distillation process may be carried out in practice according to my invention, but the process is not necessarily restricted to these examples.

Example I 110 gallons or 880 pounds of castor oil is first intimately mixed with 88 pounds of sodium chloride. This mixture is then charged into a distillation kettle of 200 gallon capacity, (allowing about 35% of space in the kettle for the rise of the liquid due to the co-efficient of expansion) and the mass is then heated to a temperature of 400° F. This should be reached in about one hour. At this temperature the ebullition of the mass in the kettle is visible, and the distillation commences. The heating under the kettle is so regulated and controlled that the rise of the temperature of the mass in the kettle is not greater than about 1° F. per minute during the entire batch distillation. It should take to complete between 6 and 7 hours at a temperature up to 775° F. to 800° F.

Example II 110 gallons or 880 pounds of castor oil intimately mixed with 88 pounds of aluminum hydrate is charged into the distillation kettle (200 gallon capacity). The mass is then heated by the same procedure to about 400° F. when the castor oil will start to distill off in the following manner:

At about 575° F. 10% of the charged castor oil distills off.
At about 600° F. 15% of the charged castor oil distills off.
At about 625° F. 20% of the charged castor oil distills off.
At about 645° F. 30% of the charged castor oil distills off.
At about 655° F. 35% of the charged castor oil distills off.
At about 670° F. 45% of the charged castor oil distills off.
At about 680° F. 55% of the charged castor oil distills off.
At about 690° F. 60% of the charged castor oil distills off.
At about 700° F. 65% of the charged castor oil distills off.
At about 710° F. 70% of the charged castor oil distills off.
At about 720° F. 80% of the charged castor oil distills off.
At about 725° F. 85% of the charged castor oil distills off.
At about 735° F. 90% of the charged castor oil distills off.
At about 775° F. 96% of the charged castor oil distills off.

The balance of 4% of the original mass remains at the bottom of the distillation kettle in the form of a coke-like residue.

In practicing the invention I have also discovered that it is advantageous to increase the amount distillation agent in proportion to the castor oil. For example, if the amount of diatomaceous earth is increased from 10% based on the weight of the castor oil, to 14 to 15%, the length of time required for the complete distillation is reduced by hours, and normal and constant ebullition proceeds until the end of the distillation. The use of the increased amount of diatomaceous earth permits the temperature to be raised at a higher rate as ebullition prevents boiling over.

The castor oil distillate obtained by this method is then subjected to purification processes, whereby the free oleic acid existing in the original castor oil or formed during the distillation period, is neutralized and re-refined until pure and neutral. It can be neutralized in the following manner.

Sodium hydroxide equal to the weight of 2½ of the total weight of the first distillate, is dissolved in water equal to 40% of the weight of the first distillate. The distillate is heated to about 150 to 160° F., and the solution of sodium hydroxide poured into the distillate and agitated for a half hour. Then the mixture is allowed to settle until the separation is complete and the distillate has a transparent clear color. The bottom product which is the sodium hydroxide solution and impurities, including that of free fatty acids, is withdrawn from the bottom of the tank. Then the substances in the oil were washed with hot water until neutral to litmus paper. The so-neutralized substances were put in a retort and distilled off, after which they were ready for blending with petroleum products.

Because of my invention of the complete distillation of castor oil, whereby the gum forming element inherent in the original castor oil is eliminated or reformed, and whereby the said converted castor oil is rendered miscible with mineral oil and fixed oil, the said distillate can be used advantageously as an additive agent for improving mineral lubricating oils. The purpose and function of the castor oil distillate is to impart its inherent active principle and "oiliness" to the mineral oil, thus imparting to the latter, better wetting power, spreading ability, and metal absorbed film-lubrication properties.

I now give the following examples showing the application of my invention, these however, are merely illustrative. The distillates referred to below are those designated in Example II.

Example A

1% of the castor oil distillate which distills off between 500 and 750° F. is amalgamated with a mineral lubricating oil for the lubrication of internal combustion engines of automotive type.

Example B

5% of the castor oil distillate which distills off between 500 and 750° F. is amalgamated with mineral oil of suitable viscosity to be used in lubrication of airplane motors.

Example C

5% of the castor oil distillate which distills off between 500 to 750° F. when amalgamated with a mineral oil of 95 to 105 seconds, Saybolt Universal, at 100° F. in which 1% of sulphur is dissolved (the 1% of sulphur being taken by weight of the total mass), makes in composite form a superior lubricant and better "coolant" for cutting operations on tough carbon steel, giving a better finish and longer tool life.

Example D

20% of the castor oil distillate which distills off between 275 to 500° F. when amalgamated with a mineral oil distillate (kerosene) possesses solvent action on most of the oleo-resin gum. Being a non-volatile and non-corrosive to metals or alloys, its use, therefore, is advantageous for removing "heat frozen" or rusted nuts and bolts when taking machinery apart; particularly when removing automobile cylinder heads.

Example E

20% of the castor oil distillate which distills off between 400 to 600° F. is amalgamated with a petroleum distillate having viscosity of 95 to 105, Saybolt Universal seconds at 100° F., for use in lubricating precision instruments, which require a lubricant having a low pour point and one that is free of gumming tendencies.

Example F

20% of the castor oil distillate which distills off from 275 to 500° F. is amalgamated with a petroleum distillate having a viscosity of 95 to 105 Saybolt Universal seconds at 100° F. for use as fuel lubrication such as in gasoline used in internal combustion engines.

While I have disclosed preferred methods of treating castor oil, and products to be made therefrom, it will be apparent to those skilled in the art that changes may be made in the details disclosed, without departing from the spirit of the invention, as expressed in the following claims.

What I claim and desire to secure by Letters Patent is:

1. In the treatment of castor oil, the steps of distillating castor oil in the presence of a lesser amount of distillation agent from the class consisting of clay, diatomaceous earth, aluminum hydrate, anhydrous silica, and silica gel, until substantially all of the oil has undergone distillation but without solidification of the distilland, and condensing the distillate vapors.

2. In the treatment of castor oil, the steps of distilling castor oil in the presence of a distillation agent from the class consisting of clay, diatomaceous earth, aluminum hydrate, anhydrous silica, and silica gel, until substantially all of the oil has undergone distillation but without solidification of the distilland, and condensing the distillate vapors, the distillation agent present being substantially one-tenth the weight of the castor oil.

3. In the treatment of castor oil, the steps of distilling castor oil in the presence of a lesser amount of distillation agent from the class consisting of clay, diatomaceous earth, aluminum hydrate, anhydrous silica, and silica gel, until substantially all of the oil has undergone distillation but without solidification of the distilland, and condensing the distillate vapors, the castor oil and distillation agent being maintained out of contact with brass or copper during the distillation.

4. In a process of treating castor oil, the steps of charging a retort about 65% full with castor oil and a lesser amount of a distillation agent of the class consisting of clay, diatomaceous earth, aluminum hydrate, anhydrous silica, and silica gel, and then distilling the contents of the retort until substantially all of the oil charge has been distilled off from the retort without solidification of the distilland, and condensing the distillate vapors.

5. In a process of treating castor oil, the steps of intimately mixing castor oil with substantially one-tenth its weight of a distillation agent of the class consisting of clay, diatomaceous earth, aluminum hydrate, anhydrous silica, and silica gel, heating said mixture in a batch still having a greater capacity than the amount of material charged, until a temperature of substantially 400° F. is reached and then gradually raising the temperature of the mixture until the oil has undergone distillation without solidification of the distilland, and condensing the vapors.

6. A process for the substantially complete distillation of castor oil, whereby the gum forming element inherent in the original castor oil is eliminated or reformed, and whereby the said castor oil distillate is rendered miscible with mineral oil and fixed oils, comprising intimately mixing castor oil with a minor percentage of its weight of a distillation agent of the class consisting of clay, diatomaceous earth, aluminum hydrate, anhydrous silica, and silica gel, then heating such mixture in a batch still of materially greater capacity than the amount of the material charged thereto, until a temperature of substantially 400° F. is reached, then gradually increasing the temperature up to substantially 775° F. until substantially all the oil has undergone distillation without solidification of the distilland, and condensing the distillate vapors.

7. In a method of treating castor oil, the steps comprising intimately mixing castor oil with a minor percentage but not over substantially fifteen percent its weight of a distillation agent from the class consisting of clay, diatomaceous earth, aluminum hydrate, anhydrous silica, and silica gel, heating such mixture in a batch still with a vapor space above the liquid, until a temperature of substantially 400° F. is reached, then gradually increasing the temperature over a period of substantially six to seven hours, until a temperature of substantially 775° F. is reached, and substantially all of the oil has undergone distillation without solidification of the distilland, and condensing the resultant vapors.

8. A process as claimed in claim 6, in which substantially 1% of the distillate which was distilled off between 500 and 750° F. is almagamated with a mineral lubricating oil.

9. A process as claimed in claim 6, in which substantially 5% of the castor oil distillate which was distilled off between 500 and 775° F. is amalgamated with mineral lubricating oil.

10. A process as claimed in claim 6, in which substantially 5% of the castor oil distillate which distilled off between 500 and 750° F. is amalgamated with a mineral oil of 95 to 105 seconds, Saybolt Universal at 100° F., in which 1% of sulphur is dissolved (taken by weight of the total mass).

11. A process as claimed in claim 6, in which 20% of the castor oil distillate which distilled off between 275 to 500° F. is amalgamated with a mineral oil distillate of the type of kerosene.

12. A process as claimed in claim 6, in which 20% of the castor oil distillate which distilled off between 400 to 600° F. is amalgamated with a petroleum distillate having a viscosity of 95 to 105 Saybolt Universal seconds at 100° F.

13. A composition consisting of substantially 1% of a castor oil distillate which had been distilled off between 500 and 750° F. in the presence of a distillation agent of the class consisting of clay, diatomaceous earth, aluminum hydrate, anhydrous silica, and silica gel, and substantially 99% mineral lubricating oil.

14. A composition comprising substantially 5% of a castor oil distillate distilled in the presence of a distillation agent of the class consisting of clay, diatomaceous earth, aluminum hydrate, anhydrous silica, and silica gel, and substantially 95% of a mineral oil.

15. A product consisting of about 20% of a castor oil distillate which was distilled off between 275 and 600° F., in the presence of a distillation agent of the class consisting of clay, diatomaceous earth, aluminum hydrate, anhydrous silica, and silica gel, and about 80% of a mineral oil distillate.

16. In a process of treating castor oil, the steps of intimately mixing castor oil with substantially fifteen percent its weight of a distillation agent of the class consisting of clay, diatomaceous earth, aluminum hydrate, anhydrous silica, and silica gel, heating said mixture in a batch still having a greater capacity than the amount of material charged, until a temperature of substantially 400° F. is reached, and the oil undergoes ebullition, and then heating at a rate that the distilland rises in temperature not over substantially 1° F. per minute to 750° F. and substantially all the castor oil distills off in substantially six to seven hours.

17. In the treatment of castor oil, the steps of distilling castor oil in the presence of a lesser amount of fuller's earth until substantially all of the oil has undergone distillation but without solidification of the distilland, and condensing the distillate vapors.

18. In a process of treating castor oil, producing a mixture of about 85% castor oil and about 15% of a distillation agent of the class consisting of clay, diatomaceous earth, aluminum hydrate, anhydrous silica, and silica gel, subjecting such mixture to distillation until substantially all of the oil has undergone distillation but without solidification of the distilland, and condensing the distillate vapors.

ADAM J. PALUSZEK.